UNITED STATES PATENT OFFICE.

JAMES ALFRED TURNER, OF MANCHESTER, ENGLAND.

IMPROVEMENT IN WATER-PROOF COMPOSITIONS.

Specification forming part of Letters Patent No. 150,636, dated May 5, 1874; application filed April 11, 1874.

*To all whom it may concern:*

Be it known that I, JAMES ALFRED TURNER, of Manchester, in the county of Lancaster, England, have invented Improvements in the Manufacture of Water-Proof Fabrics, of which the following is a specification:

This invention relates to the manufacture of that class of water-proof material, for sheeting and other purposes, which is composed of two or more thicknesses of woven or felted fabric, either in the gray, bleached, dyed, or printed state, or otherwise finished, including imitation leather, oiled cloth, and other similar fabrics, or leather united together by a water-proof material or composition.

The water-proof material hitherto employed for this purpose has been a solution of india-rubber or gutta-percha in naphtha or other solvent.

My invention consists in substituting for the solution of india-rubber or gutta-percha ordinarily employed a composition of vegetable and mineral pitches.

This composition may be applied to the fabric or fabrics in the same manner as the india-rubber solution, or in any other convenient manner.

It will be found to be quite as pliable and water-proof as the india-rubber, not liable to run in hot climates, as tar would, and not brittle or liable to crack and break the fabric, as mineral pitch alone would, and will be very much more economical than the solution of india-rubber usually employed.

The pitches which I prefer to use are those obtained in the purification of cotton-seed oil and paraffine oil, mixed together in about equal quantities; but other combinations of vegetable and mineral pitches would answer the same purpose, provided that they possess the same requisite qualities, namely, adhesiveness and pliability, without brittleness or liability to run when exposed to the heat.

I claim as my invention—

The employment and use, for the purposes above specified, of a mixture or composition formed of about equal parts of the vegetable and mineral pitches obtained in the purification of cotton-seed oil and paraffine oil, or any other combination of vegetable and mineral pitches possessing the qualities above referred to.

JAMES ALFRED TURNER.

Witnesses:
GEORGE DAVIES,
JOHN HUGHES.